United States Patent
Cafeo et al.

(10) Patent No.: US 7,677,639 B2
(45) Date of Patent: Mar. 16, 2010

(54) ACTIVE MATERIAL BASED CLOSURE HINGE AND ALIGNMENT PROCESS

(75) Inventors: John A. Cafeo, Farmington, MI (US); Alan L. Browne, Grosse Pointe, MI (US); Gary L. Jones, Farmington Hills, MI (US); Nancy L. Johnson, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 400 days.

(21) Appl. No.: 11/678,085

(22) Filed: Feb. 23, 2007

(65) Prior Publication Data

US 2008/0203760 A1 Aug. 28, 2008

(51) Int. Cl.
*B60J 5/00* (2006.01)
(52) U.S. Cl. ................................. 296/146.11
(58) Field of Classification Search ........... 296/146.11, 296/146.1; 180/69.21
See application file for complete search history.

(56) References Cited

U.S. PATENT DOCUMENTS

| | | | | |
|---|---|---|---|---|
| 5,674,027 A | * | 10/1997 | Warnaar | 403/404 |
| 6,409,749 B1 | * | 6/2002 | Maynard | 623/1.1 |
| 7,455,147 B2 | * | 11/2008 | Brei et al. | 296/187.03 |
| 7,500,704 B2 | * | 3/2009 | Herrera et al. | 296/37.12 |
| 2005/0198904 A1 | * | 9/2005 | Browne et al. | 49/374 |
| 2005/0198907 A1 | * | 9/2005 | McKnight et al. | 49/475.1 |
| 2005/0212304 A1 | * | 9/2005 | Herrera et al. | 292/251.5 |
| 2006/0012191 A1 | * | 1/2006 | Brei et al. | 292/341.17 |
| 2008/0216285 A1 | * | 9/2008 | Browne et al. | 16/110.1 |
| 2009/0236884 A1 | * | 9/2009 | Lawall et al. | 297/217.3 |

* cited by examiner

*Primary Examiner*—Kiran B. Patel

(57) ABSTRACT

An adjustable closure hinge assembly, includes a first hinge portion having a first aperture, a second hinge portion having a second aperture coaxially aligned with the first aperture, a hinge member disposed in the first and second apertures for joining the first and second hinge portions, wherein the hinge member further comprises a spacer intermediate walls defining the first and second apertures and the hinge member, wherein the spacer comprises an active material, and an activation device in operative communication with the active material, wherein the activation device is operable to selectively apply an activation signal to the active material and effect a reversible change in at least one property of the active material, wherein the change in the at least one property is effective to provide up to six degrees of freedom to the hinge member and less than or equal to two degrees of freedom in the absence of the activation signal.

7 Claims, 5 Drawing Sheets

ACTIVE MATERIAL BASED CLOSURE HINGE AND ALIGNMENT PROCESS

BACKGROUND

The present disclosure generally relates to an active material based closure hinge, an active material based latch, and an active material based alignment process, and more particularly, to a process for aligning closures to a frame.

The alignment as well as the flush and gap appearance of a vehicle door is typically based on the visual inspection and experience of an assembly line technician. In other instances, handheld fixtures are specially designed to align the door relative to predetermined specifications. In both cases, the process for adjusting the flush and gap appearance and aligning the vehicle door is manual. Current practice is to deform the door, body and hinge sheet metal manually, by bending, twisting and shoving the door until it is visually acceptable. Also, the latch position is adjusted by striking it in order to move it. This metal deformation and latch movement is unmeasured. The adjustability is generally limited and irreversible. Because the alignment process is manual and based on visual inspection, it is difficult to quantitatively measure the door adjustment process. Without quantitative measurements, developing statistical process control techniques is impractical. As a result, gap and flushness quality tends to be inconsistent from vehicle to vehicle.

There are two issues in making a door fit an opening. The first is that the door must be in the proper location and orientation (pose) within the opening. The second is that the contours of the door must match the contours of the opening. The invention disclosed herein addresses the first issue directly.

To those skilled in the art, it is known that six independent degrees of freedom (three translational and three rotational) are enough to adjust a rigid body to a desired pose. The more degrees of freedom internal to the hinges and latches, the less deformation that is required to adjust the pose of the door. Current hinge systems may have two degrees of freedom for adjustment considering the latch and hinge mechanisms. Thus, sheet metal deformation may be required to adjust the pose.

Accordingly, there is a need for an improved closure hinge, latch and alignment process. It would be particularly advantageous if the deformation needed for closure adjustment were internal to the hinge and latch mechanisms themselves and thereby avoided deforming the sheet metal of the body, doors and hinges. This would allow the alignment process to be done in a consistent, quantifiable, and reversible manner.

BRIEF SUMMARY

Disclosed herein are active material based closure hinge assemblies, latch assemblies, and alignment methods. In one embodiment, an adjustable closure hinge assembly, includes a first hinge portion having a first aperture, a second hinge portion having a second aperture coaxially aligned with the first aperture, a hinge member disposed in the first and second apertures for joining the first and second hinge portions, wherein the hinge member further comprises a spacer, intermediate walls defining the first and second apertures and the hinge member, wherein the spacer comprises an active material, and an activation device in operative communication with the active material, wherein the activation device is operable to selectively apply an activation signal to the active material and effect a reversible change in at least one property of the active material, wherein the change in the at least one property is effective to provide up to six degrees of freedom of adjustment to the hinge member and less than or equal to two degrees of freedom in the absence of the activation signal.

A method for adjustably attaching a closure to a vehicle body, includes activating an active material spacer disposed intermediate a hinge member and walls defined by apertures of a first hinge portion and a second hinge portion, wherein the hinge member has up to six degrees of freedom upon activating the active material, wherein the first hinge portion is attached at one end to a closure and the second hinge portion has one end attached to the vehicle body, aligning the closure to a desired position relative to the vehicle body, and deactivating the active material to maintain the closure in the desired position relative to the vehicle body, wherein the hinge member has less than or equal to two degrees of freedom.

In another embodiment, a closure assembly, includes a first hinge portion having one end attached to a closure, a second hinge portion attached to the first hinge portion having one end attached to a vehicle body, and an active material configured to provide the first hinge portion with up to six degrees of freedom relative to second hinge portion upon receipt of an activation signal and less than or equal to two degrees of freedom in the absence of the activation signal.

In yet another embodiment, an adjustable latch assembly, includes a bracket having a first and second aperture, a hinge member disposed in the first and second apertures, wherein the hinge member comprises a spacer, intermediate walls defining the first and second apertures and the hinge member, wherein the spacer comprises an active material, a latch configured to engage the hinge member, and an activation device in operative communication with the active material, wherein the activation device is operable to selectively apply an activation signal to the active material and effect a reversible change in at least one property of the active material, wherein the change in at least one property is effective to provide up to six degrees of freedom to the hinge member and less than or equal to two degrees of freedom in the absence of the activation signal.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Active material based closure assemblies and methods for adjustable alignment of the closure relative to a frame are disclosed herein. In contrast to prior art closure assembly alignment processes, the closure assemblies (hinge and latch) and methods disclosed herein are advantageously based on active materials. As used herein, the term "closure" is intended to include any panel hingeably attached to a frame. For example, the term "closure" is intended to generally include a vehicle passenger door, vehicle hood, vehicle trunk, glove box panel, center console panel, lift gates, tail gates, cargo latches, and the like. Moreover, the term "closure" could include a refrigerator door, cabinet door, or the like. In a preferred embodiment, the closure is related to a panel used in the assembly of a vehicle, such as a door.

The term "vehicle body" as used herein generally refers to parts of the vehicle onto which the closure may be hingeably attached, and includes, without limitation, body panels, chassis, frame and sub-frame components, jams, pillars, and the like. The term "active material" as used herein generally refers to a material that exhibits a change in a property such as dimension, shape, shear force, or flexural modulus upon application of an activation signal. Suitable active materials include, without limitation, shape memory polymers (SMP), shape memory alloys (SMA), magnetic shape memory alloys (MSMA), magnetorheological elastomers (MR elastomers), electroactive polymers (EAP's), combinations thereof, and the like. Depending on the particular active material, the activation signal can take the form of, without limitation, an electric current, a temperature change, a magnetic field, a mechanical loading or stressing, and the like.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges directed to the same quantity of a given component or measurement is inclusive of the endpoints and independently combinable.

Figure 1:
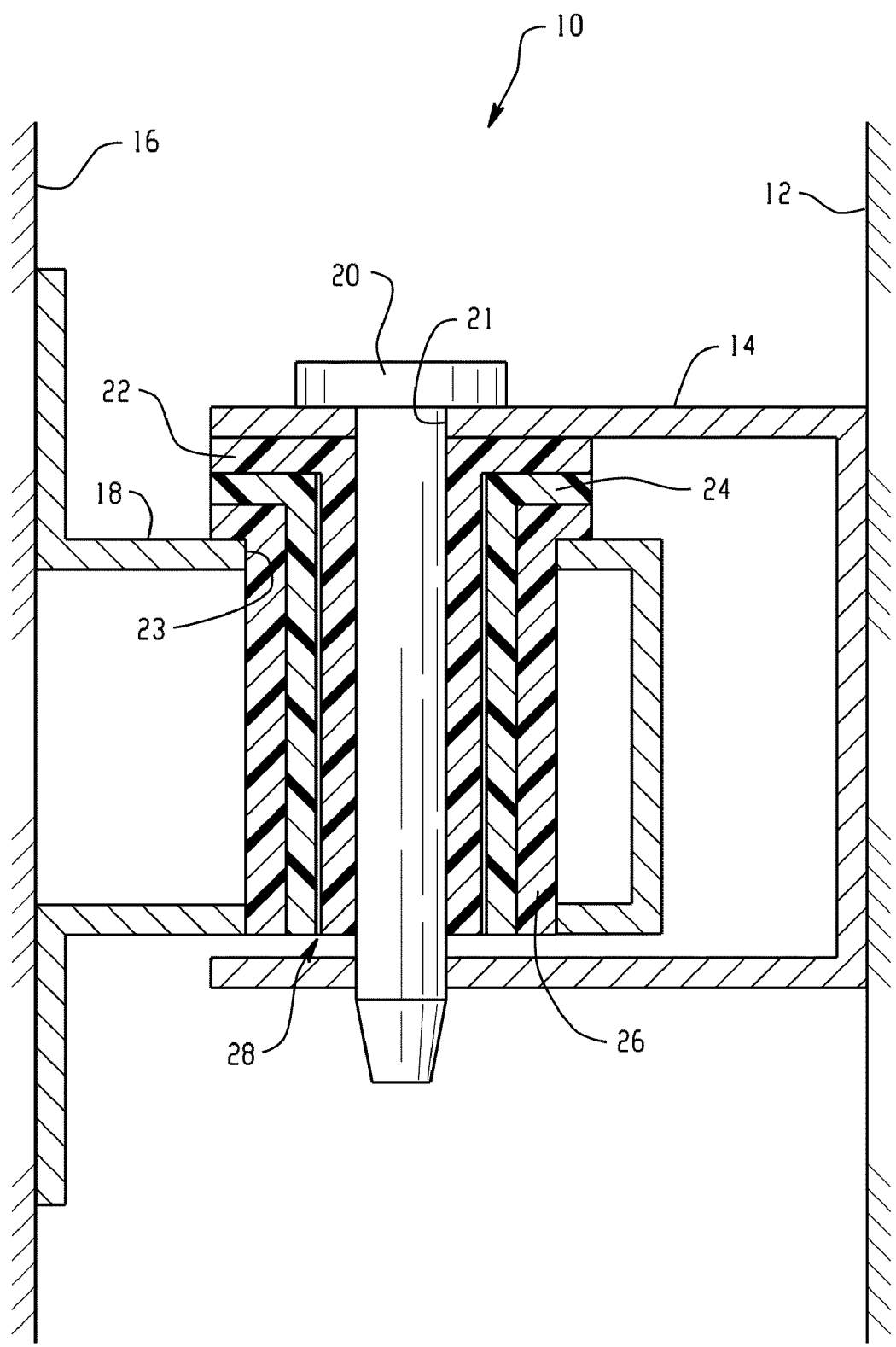
FIG. 1 is a schematic illustration of one embodiment of an active material based adjustable closure hinge assembly.

Turning now to FIG. 1, an exemplary active material based adjustable closure hinge assembly, generally designated by reference numeral 10, is illustrated. The adjustable closure hinge assembly is not intended to be limited to this particular embodiment nor is it intended to be limited to any specific active material therein. The adjustable closure hinge assembly 10 has a first hinge portion 14 having one end fastened to a closure 12 and a second hinge portion 18 fastened to a vehicle body 16 for receiving the closure. The first and the second hinge portions 14, 18 include first aperture 15 and second aperture 19, respectively, defined by walls 21 and 23, respectively, in which there is disposed a hinge member 20. The hinge member 20 pivotally engages the first and second portions 14, 18 to effect movement of the closure 12 relative to the vehicle body 16. The hinge member 20 may be any object suitable for connecting the first and second portions 14 and 18 and allowing rotation between them, such as, a pintle, bolt, hitch, pin, hook, and the like. Similarly, the first and second hinge portions 14, 18 may be any support generally known in the art that is suitable for receiving the hinge member 20 in order to hingeably attach the closure 12 to the vehicle body 16. A spacer 24, intermediate the walls 21 and 23 which define the apertures of first and second hinge portions 14, 18, is made of an active material and is disposed in the apertures so as to separate hinge member 20 from direct contact with the second hinge portion 18. Optionally, a sleeve 22 and a bushing 26 may also be disposed in the apertures 15, 19 on either side of the spacer 24 so as to separate the spacer 24 from direct contact with the hinge member 20 or the second hinge portion 18. The sleeve and/or bushing themselves may be composed of active materials as well. The spacer 24 is in operative communication with an activation device 28. As will be apparent to those skilled in the art in view of this disclosure, the activation device 28 can be in contact with the active material portions defining the spacer, sleeve and bushing, e.g., via a resistive heating element, or may be externally disposed, e.g., a heat gun.

The activation signal provided by the activation device may include a heat signal, a magnetic signal, an electrical signal, a pneumatic signal, a mechanical signal, and the like, and combinations comprising at least one of the foregoing signals, with the particular activation signal dependent on the materials and/or configuration of the active material. A heat signal may be applied for changing the property of the active material fabricated from shape memory alloys and/or shape memory polymers. An electrical signal may be applied for changing the property of the active material fabricated from electroactive materials, electrostatics, and/or electronic EAP's. A magnetic field may be applied (removed, or changed) for changing the property of the active material fabricated from magnetostrive materials such as MSMA and MR elastomers.

Desirably, the change in the property of the active material remains for the duration of the applied activation signal. Also desirably, upon discontinuation of the activation signal, the property reverts substantially to its original form prior to the change if no force is being applied. Conversely, if a force and/or load is being applied at the time of deactivation, the property will lock in the new desired form upon deactivation. In this manner, reversibility and multiple resets for alignment can advantageously occur.

Depending on the particular closure hinge assembly chosen, the active material may be deformed as the correct alignment of the closure relative to the vehicle body is established. The closure is held in place as the active material is deactivated thereby locking the deformation of the active material into the spacer. Optionally, the closure may include a plurality of closure hinge assemblies at various points about its perimeter. Multiple closure hinge assemblies may provide increased security, increased torsional stiffness, increased energy absorption in an impact event, and the like.

Figure 2:
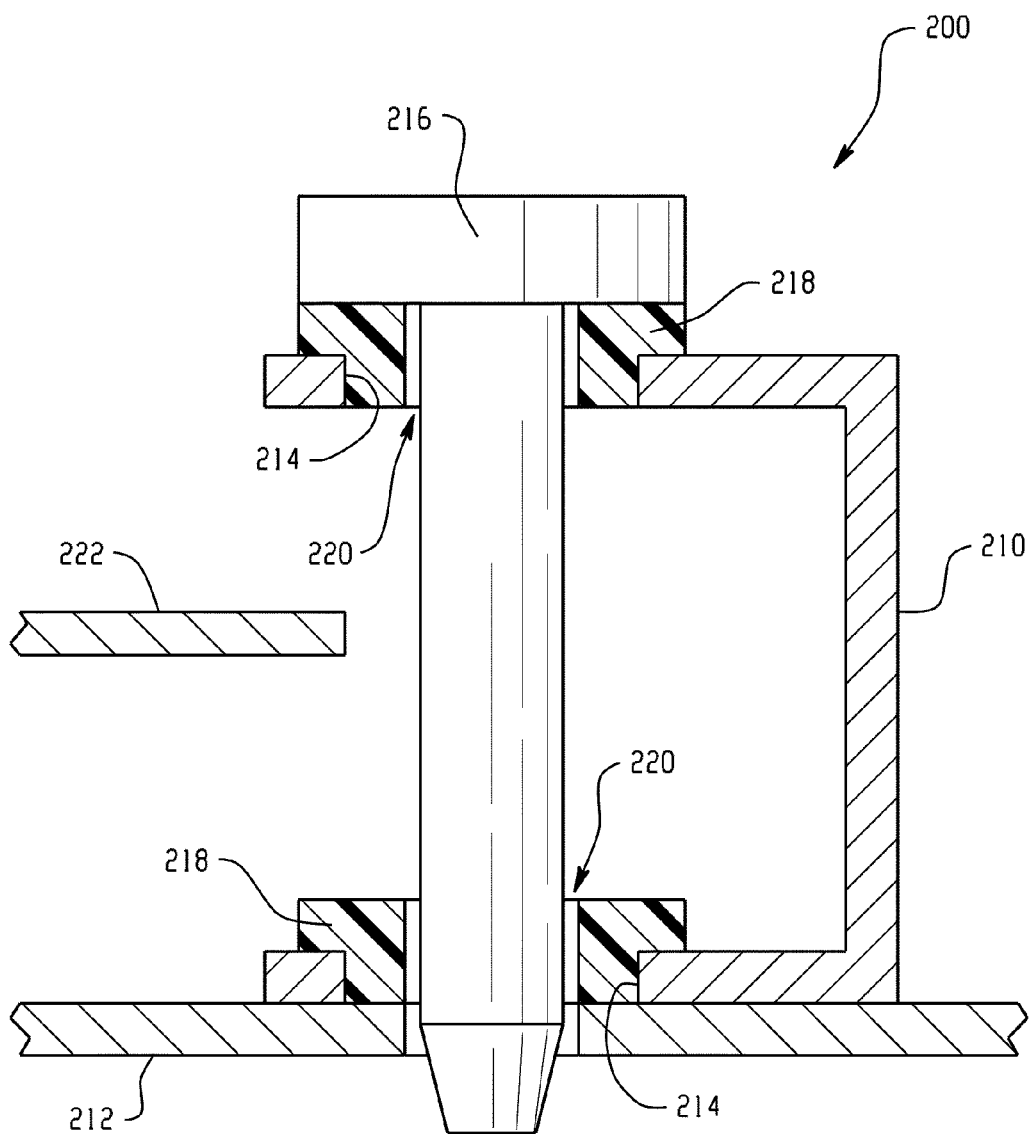
FIG. 2 is a schematic illustration of one embodiment of an active material based closure latch assembly.

Turning now to FIG. 2, an exemplary embodiment of an adjustable latch assembly 200, for use with the above-described hinge assembly, is illustrated. The adjustable latch assembly is not intended to be limited to this particular embodiment nor is it intended to be limited to any specific active material therein. The latch assembly 200 has a bracket 210 having one end fastened to a vehicle body 212. The bracket 210 includes apertures defined by walls 214 in which there is disposed a latch pin 216. A spacer 218, intermediate the walls 214, is made of an active material and is disposed in the apertures defined by the walls 214 so as to separate latch pin 216 from direct contact with the bracket 210. The spacer 218 is in operative communication with an activation device 220. As will be apparent to those skilled in the art in view of this disclosure, the activation device 220 can be in contact with the active material portions defining the spacer 218, e.g., via a resistive heating element, or may be externally disposed, e.g., a heat gun. A latch 222 is configured to engage the latch pin 216, thereby holding a swing closure (not shown) in place. The latch assembly 200, in combination with the above-disclosed hinge 10, allows for adjustable alignment of a closure relative to a vehicle body upon activation of the active materials. As such, the methods and embodiments described below are intended to include both active material based closure hinge assemblies as well as active material based latch assemblies.

Figure 3:
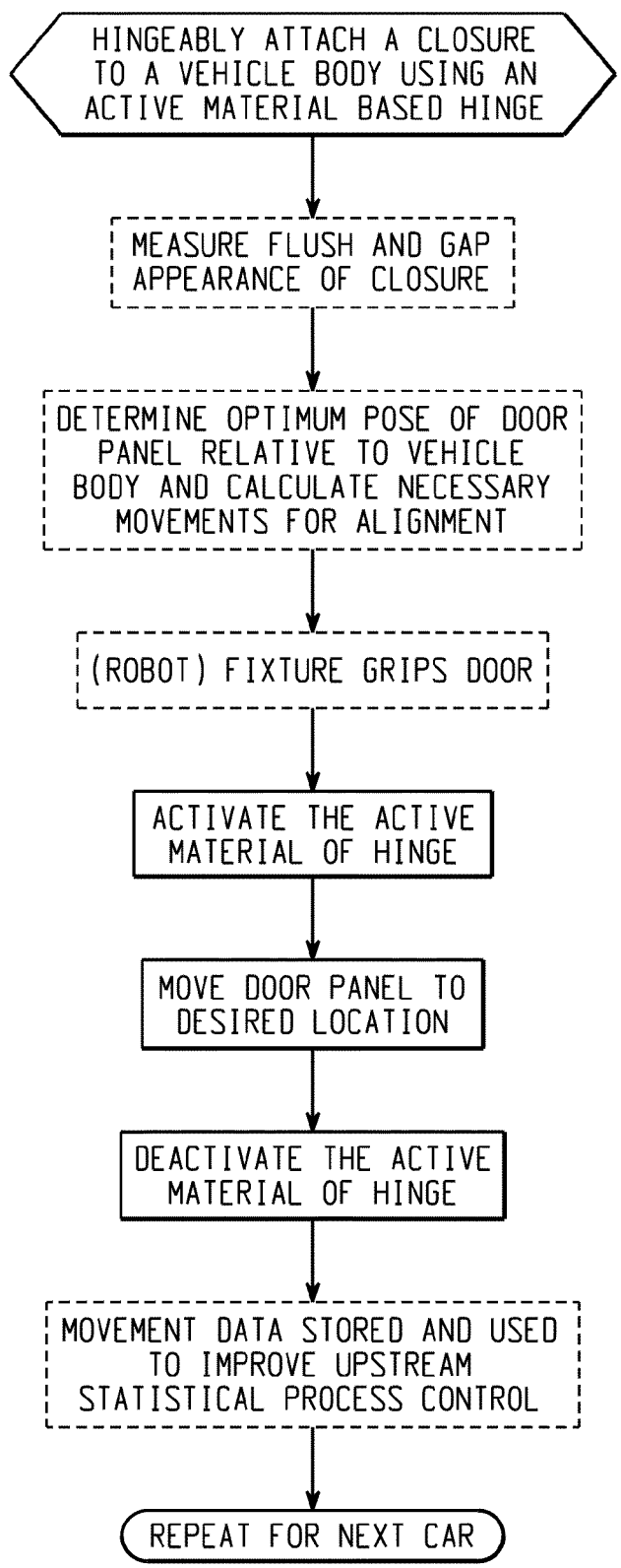
FIG. 3 is a flowchart of an embodiment of an active material based closure assembly alignment method.

FIG. 3 is a flow chart exemplifying one embodiment of a method for closure alignment using an active material based closure hinge and latch assembly such as is described above. The flow chart contains optional process steps indicated by dashed boxes. The method generally comprises hingeably attaching a closure to a vehicle body, e.g., a closure frame. The method includes aligning apertures disposed in a first hinge portion that is attached to the closure with apertures disposed in a second hinge portion attached to the vehicle body. A spacer formed of an active material is inserted into the apertures of the first and second hinge portions after which a hinge member is then disposed in the apertures to pivotally connect the closure to the vehicle body. An activation device is in operative communication with the active material. To effect alignment of the closure relative to the vehicle body, the active material of the spacer is activated to cause a change in a property of the active material. For example, if the spacer were formed of a SMP, heating the SMP above the transition temperature of the lower temperature phase would dramatically lower its modulus so as to permit movement of the closure about the pivot axis of the hinge member. The use of SMP to describe the flow chart is exemplary; other types of active materials and their properties are discussed in more detail below. When the desired alignment tolerances are achieved, the active material is deactivated. For example, cooling the SMP below the transition temperature of the lower temperature phase increases its modulus, thereby locking the closure in a fixed position relative to the vehicle body. The process may be repeated any number of desired times to affect the desired flush and gap appearance. Furthermore, the process may be repeated not only during manufacturing of the vehicle, but at any time during the vehicle's use life.

Advantageously, the active material based closure hinge and latch assemblies used in the disclosed alignment process may have multiple motion adjustment directions (e.g., up to six degrees of freedom). For example, the disclosed closure hinge assembly as described in FIG. 1 as well as the latch assembly described in FIG. 2, have at least four degrees of freedom. The closure hinge assembly as described below in FIG. 5, has at least five degrees of freedom. Upon deactivation, or in the absence, of the activation signal, the closure hinge and latch assemblies have less than or equal to two degrees of freedom. As is well recognized by those in the art, the degrees of freedom may include, for example, pitch adjustment, sway adjustment, yaw adjustment, roll adjustment, surge adjustment, up-down adjustment, and the like.

As designated by the dashed boxes of FIG. 3, the above-disclosed method can further include optional process steps for aligning a closure. For example, the flush and gap appearance of the closure relative to the vehicle body can be measured. This may be quantitatively measured using a vision sensor, or the like. Moreover, the process may further include determining the optimum pose of the door panel relative to the vehicle body. For example, rigid body kinematics may be used to determine the optimum pose and calculate the necessary movements for proper alignment. Even further, a fixturing device may be applied to the door panel prior to activating the active material of the adjustable hinge. After the active material based hinge is activated, the fixturing device may move the door panel to the desired location based on the movements calculated by the rigid body kinematics step. Finally, once the active material based hinge is deactivated, the process may optionally include storing the movement data to create statistical process control techniques and improve closure alignment consistency from vehicle to vehicle.

Figure 4A:
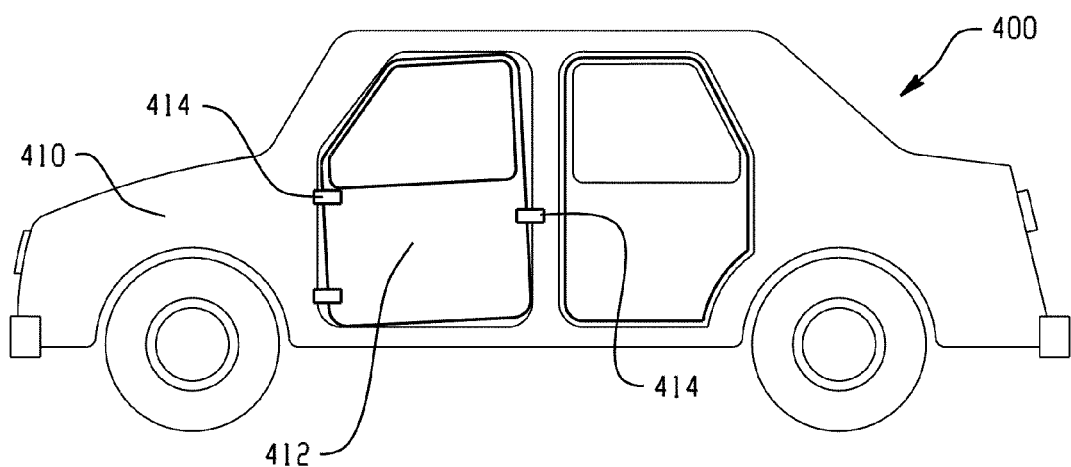
FIG. 4 is an illustration of aligning a door using an active material based closure assembly showing (a) a rotationally misaligned door panel, (b) a translationally misaligned door panel, and (c) a properly aligned door panel.
Figure 4B:
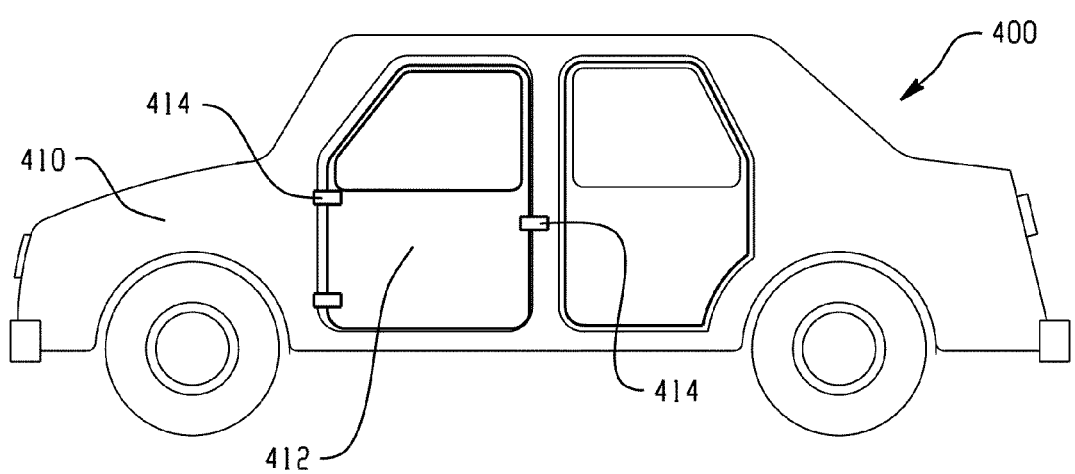
Figure 4C:
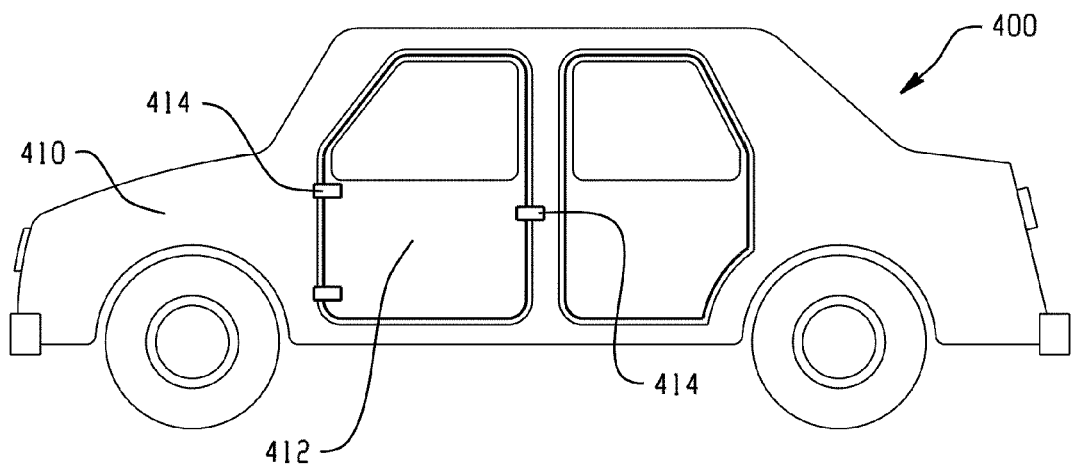

FIG. 4 depicts a vehicle 400 having a vehicle body 410 and a door panel 412. A plurality of active material based closure hinge assemblies and/or latch assemblies 414 are disposed about the vehicle door panel 412. The bold-outlined rectangles indicate the location of the active material based closure hinge and latch assemblies 414 in each figure. Prior to the closure alignment process, a door panel when manually mounted to the door frame may be rotationally misaligned (FIG. 4(a)), translationally misaligned (FIG. 4(b)), any combination of translational and rotational misalignment, and the like. By using an active material in the adjustable closure hinge and latch assemblies such as described above, a fixturing device can be used to align the door based on previous quantitative measurements or pre-determined flush and gap appearance specifications. In this case, the active material is activated during fixturing. The active material may then be deactivated to hold the door panel in proper alignment relative to the vehicle body, as shown in FIG. 4(c). As illustrated, the disclosed active material based method provides for alignment in multiple directions.

Figure 5A:
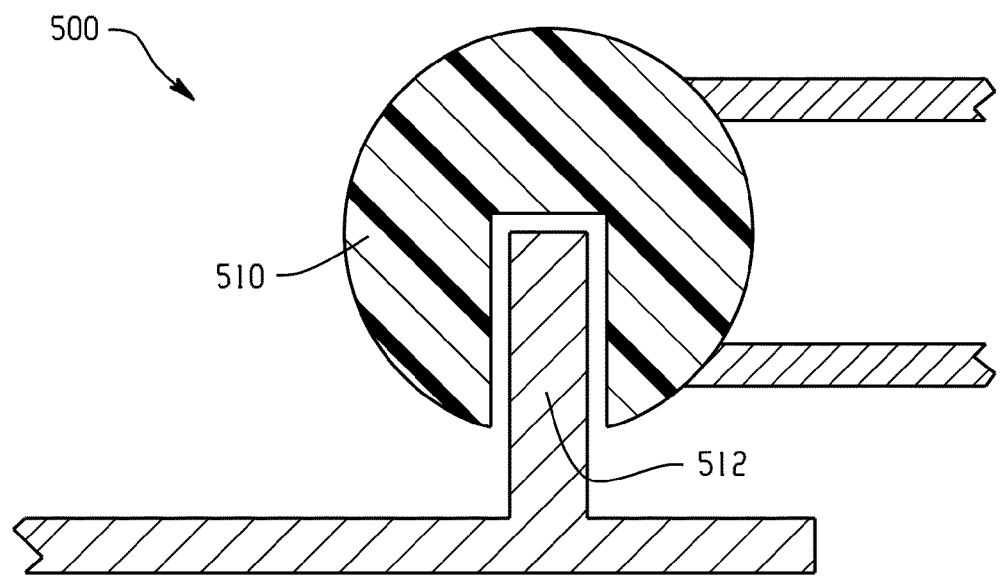
FIG. 5 is a schematic view of one embodiment of an active material based adjustable closure hinge assembly.
Figure 5B:
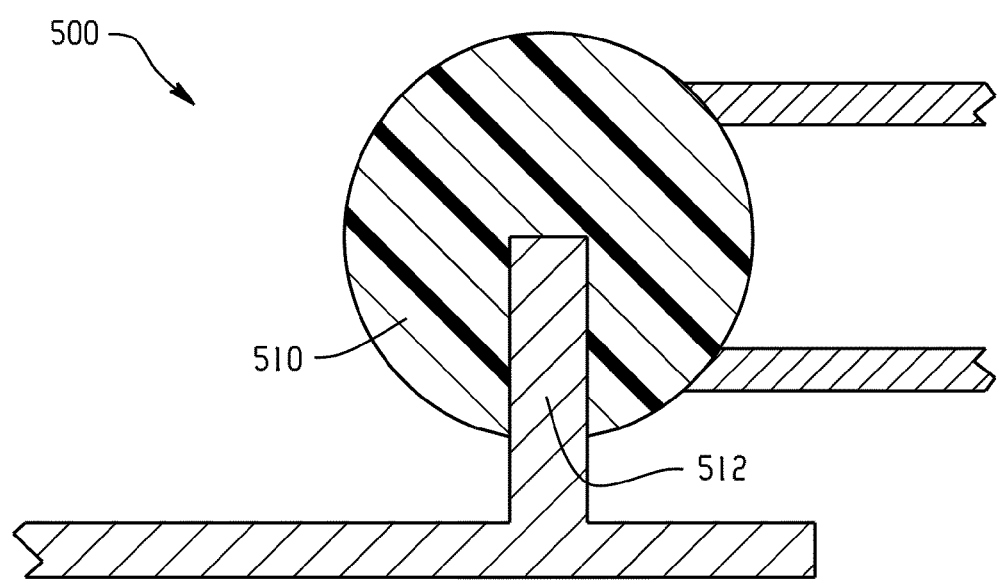

FIG. 5 is another exemplary active material based adjustable closure hinge assembly, generally designated 500. Adjustable closure hinge assembly 500 has a first hinge portion 510 and a second hinge portion 512. The first hinge portion 510 may be connected to a closure, while the second hinge portion 512 may be connected to a vehicle body. In this particular embodiment, first hinge portion 510 may be composed of an active material. The active material could be, for example, an SMA having a porous structure, such as, open cell, mesh, and the like. In operation, the SMA first hinge portion 510 could be compressed in volume, pseudoplastically, while in the lower temperature, lower modulus Martensite state, leaving a gap between the first hinge portion 510 and the second hinge portion 512. The gap would allow for position alignment of the closure relative to the vehicle body. Once the desired alignment of the adjustable hinge is established, the SMA first hinge portion 510 could then be heated above its phase transformation temperature, thus activating the shape memory property of the SMA causing the first hinge portion 510 to expand and fill the gap between the first hinge portion 510 and the second hinge portion 512. When the gap is filled, the first hinge portion 510 frictionally engages the second hinge portion 512. The SMA can be subsequently cooled to set the new deformed first hinge portion 510 and fix the desired position of the closure. Again, advantageously, the disclosed closure hinge has up to six degrees of freedom, thereby permitting alignment in up to six directions. Note that an equally valid variant, for which the above process holds, is one in which MSMA is substituted for SMA and the application of a magnetic field is substituted for thermal activation.

As previously described, suitable active materials for grommets, spacers, hinge portions, and the like, include, without limitation, shape memory polymers (SMP), shape memory alloys (SMA), magnetic shape memory alloys (MSMA), MR elastomers, and EAP's.

"Shape memory polymer" generally refers to a polymeric material, which exhibits a change in a property, such as an elastic modulus, a shape, a dimension, a shape orientation, or a combination comprising at least one of the foregoing properties upon application of an activation signal. Shape memory polymers may be thermoresponsive (i.e., the change in the property is caused by a thermal activation signal), photoresponsive (i.e., the change in the property is caused by a light-based activation signal), moisture-responsive (i.e., the change in the property is caused by a liquid activation signal such as humidity, water vapor, or water), or a combination comprising at least one of the foregoing.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature with the load removed. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent of the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 40° C. Another temperature for shape recovery may be greater than or equal to about 100° C. Another temperature for shape recovery may be less than or equal to about 250° C. Yet another temperature for shape recovery may be less than or equal to about 200° C. Finally, another temperature for shape recovery may be less than or equal to about 150° C.

Optionally, the SMP can be selected to provide stress-induced yielding, which may be used directly (i.e. without heating the SMP above its thermal transition temperature to 'soften' it) to make the pad conform to a given surface. The maximum strain that the SMP can withstand in this case can, in some embodiments, be comparable to the case when the SMP is deformed above its thermal transition temperature.

Although reference has been, and will further be, made to thermoresponsive SMPs, those skilled in the art in view of this disclosure will recognize that photoresponsive, moisture-responsive SMPs and SMPs activated by other methods may readily be used in addition to or substituted in place of thermoresponsive SMPs. For example, instead of using heat, a temporary shape may be set in a photoresponsive SMP by irradiating the photoresponsive SMP with light of a specific wavelength (while under load) effective to form specific crosslinks and then discontinuing the irradiation while still under load. To return to the original shape, the photoresponsive SMP may be irradiated with light of the same or a different specific wavelength (with the load removed) effective to cleave the specific crosslinks. Similarly, a temporary shape can be set in a moisture-responsive SMP by exposing specific functional groups or moieties to moisture (e.g., humidity, water, water vapor, or the like) effective to absorb a specific amount of moisture, applying a load or stress to the moisture-responsive SMP, and then removing the specific amount of moisture while still under load. To return to the original shape, the moisture-responsive SMP may be exposed to moisture (with the load removed).

Suitable shape memory polymers, regardless of the particular type of SMP, can be thermoplastics, thermosets-thermoplastic copolymers, interpenetrating networks, semi-interpenetrating networks, or mixed networks. The SNIP "units" or "segments" can be a single polymer or a blend of polymers. The polymers can be linear or branched elastomers with side chains or dendritic structural elements. Suitable polymer components to form a shape memory polymer include, but are not limited to, polyphosphazenes, poly(vinyl alcohols), polyamides, polyimides, polyester amides, poly (amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly (lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly (octadecyl vinyl ether), poly (ethylene vinyl acetate), polyethylene, poly(ethylene oxide)-poly(ethylene terephthalate), polyethylene/nylon (graft copolymer), polycaprolactones-polyamide (block copolymer), poly(caprolactone) diniethacrylate-n-butyl acrylate, poly(norbornyl-polyhedral oligomeric silsequioxane), polyvinylchloride, urethane/butadiene copolymers, polyurethane-containing block copolymers, styrene-butadiene block copolymers, and the like. The polymer(s) used to form the various segments in the SMPs described above are either commercially available or can be synthesized using routine chemistry. Those of skill in the art can readily prepare the polymers using known chemistry and processing techniques without undue experimentation.

As will be appreciated by those skilled in the art, conducting polymerization of different segments using a blowing agent can form a shape memory polymer foam, for example, as may be desired for some applications. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N'dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen, and the like.

Similar to shape memory polymers, shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy is preferably at or below the austenite transition temperature (at or below As). Subsequent heating above the austenite transition temperature causes the expanded shape memory alloy to revert back to its permanent shape. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

Magnetic Shape Memory Alloys (MSMA) function in a manner similar to SMA, but operate under response to magnetic activation signals as opposed to temperature-based signals. MSMA are known to display excellent shape memory response speed. MSMA have a phase transition structure (a twin crystal structure). These twins have different magnetic and crystallographic orientations. When a magnetic field is applied to the MSMA, the martensitic unit cells (magnetization vectors in the cells) are reoriented along a magnetic field to induce strain resulting in the shape change of the element. Typical MSMA materials include, but are not intended to be limited to, iron-based MSMA such Fe—Pd and Fe—Pt alloys, copper-based MSMA such as Cu—Al and Cu—Al—Mn alloys, and nickel-based alloys, such as Ni—Mn—Ga and Ni—Co—Al alloys. Suitable magnetic materials further include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Magnetorheological (MR) elastomers are a group of smart materials whose modulus can be controlled by the application of an external magnetic field. MR elastomer materials include, but are not limited to, an elastic polymer matrix comprising a suspension of ferromagnetic or paramagnetic particles. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like.

The particle size should be selected so that the particles exhibit multiple magnetic domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR elastomer composition.

Suitable polymer matrices include, but are not limited to, poly-alpha-olefins, natural rubber, silicone, polybutadiene, polyethylene, polyisoprene, and the like.

Electroactive polymers include those polymeric materials that exhibit pyroelectric, or electrostrictive properties in response to electrical or mechanical fields. An example of an electrostrictive-grafted elastomer with a piezoelectric poly (vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Advantageously, the above noted active material based closure hinge, latch assemblies, and closure alignment process provide a more consistent and quantifiable method compared to current closure alignment processes. In addition to providing reversibility, the processes offer opportunities for the development of statistical process control techniques for the closure alignment process. The statistical control data can improve process efficiency as well as consistency from vehicle to vehicle. Furthermore, it should be recognized by those skilled in the art that the active material based closure hinge assembly may be configured for attachment of any hinged panel to the vehicle body.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An adjustable closure hinge assembly, comprising:
   a first hinge portion having a first wall comprising a first aperture;
   a second hinge portion having a second wall comprising a second aperture;
   a hinge member disposed in the first and second apertures and hingeably joining the first and second hinge portions;
   a spacer comprising an active polymer material disposed intermediate the first wall and second wall and intermediate the second hinge portion and the hinge member;
   a bushing disposed in the second aperture between the spacer and the second hinge portion;
   a sleeve disposed in the second aperture between the hinge member and the spacer; and an activation device in operative communication with the active polymer material, wherein the activation device is operable to selectively apply an activation signal to the active material and effect a reversible change in at least one property of the active material, wherein the change in the at least one property is effective to provide up to six degrees of freedom to the hinge member, and less than or equal to two degrees of freedom in the absence of the activation signal.

2. The adjustable closure hinge assembly of claim 1, wherein the active polymer material comprises a shape memory alloy, a ferromagnetic shape memory alloy, a shape memory polymer, a magnetorheological elastomer, an electroactive polymer, or combinations comprising at least one of the foregoing active materials.

3. The adjustable closure hinge assembly of claim 1, wherein the active polymer material comprises a shape memory polymer and the change in the at least one property comprises a change in a flexural modulus.

4. The adjustable closure hinge assembly of claim 1, wherein the active polymer material comprises a shape memory polymer and the activation signal comprises a thermal activation signal.

5. The adjustable closure hinge assembly of claim 1, further comprising:
 a closure fixedly attached to an end of the first hinge portion away from the first aperture; and
 a vehicle body fixedly attached to an end of the second hinge portion away from the second aperture.

6. The adjustable closure hinge assembly of claim 5, further comprising at least one additional adjustable hinge assembly as in claim 1, each at least one additional adjustable hinge assembly having a respective end of the first hinge portion away from the first aperture fixedly attached to the closure and a respective end of the second hinge portion away from the second aperture fixedly attached to the vehicle body.

7. The adjustable closure hinge assembly of claim 1, wherein the hinge member comprises a bolt or a pin.

* * * * *